US009956916B2

(12) United States Patent
Dalton et al.

(10) Patent No.: US 9,956,916 B2
(45) Date of Patent: May 1, 2018

(54) TRUCK MIRROR POSITIONING DEVICE (75) Inventors: Richard John Dalton, Australind (AU); Stuart Gerald Hunt, Goring on Thames (GB)

(73) Assignee: Alpine Tech Australia Pty Ltd., Busselton (AU)

( * ) Notice: Subject to any disclaimer, the term of this patent is extended or adjusted under 35 U.S.C. 154(b) by 783 days.

(21) Appl. No.: 14/240,243

(22) PCT Filed: Aug. 22, 2012

(86) PCT No.: PCT/AU2012/000983
§ 371 (c)(1),
(2), (4) Date: Feb. 21, 2014

(87) PCT Pub. No.: WO2013/026094
PCT Pub. Date: Feb. 28, 2013

(65) Prior Publication Data
US 2014/0192432 A1 Jul. 10, 2014

(30) Foreign Application Priority Data

Aug. 23, 2011 (AU) ................................ 2011903377
Nov. 23, 2011 (AU) ................................ 2011904893

(51) Int. Cl.
*B60R 1/072* (2006.01)
*B60R 1/06* (2006.01)

(52) U.S. Cl.
CPC ............ *B60R 1/072* (2013.01); *B60R 1/0612* (2013.01)

(58) Field of Classification Search
CPC ............................................ G02B 7/18–7/188

USPC .................................................. 359/871–882
See application file for complete search history.

(56) References Cited

U.S. PATENT DOCUMENTS

| 3,075,431 | A |   | 1/1963 | White |
| 3,132,201 | A |   | 5/1964 | Bertell et al. |
| 3,459,470 | A |   | 8/1969 | Hahn |
| 3,492,065 | A |   | 1/1970 | Kurz, Jr. |
| 3,576,359 | A | * | 4/1971 | Cosh ......................... H01F 7/06 |
|           |   |   |        | 310/12.04 |
| 3,788,734 | A | * | 1/1974 | McDuffee, Sr. ........ B60R 1/072 |
|           |   |   |        | 359/876 |
| 3,830,561 | A |   | 8/1974 | LaFave et al. |
| 4,190,326 | A |   | 2/1980 | Brodbeck |
| 4,609,265 | A |   | 9/1986 | McKee et al. |

(Continued)

FOREIGN PATENT DOCUMENTS

WO 2011/035382 3/2011

*Primary Examiner* — William R Alexander
*Assistant Examiner* — Jeffrey Madonna
(74) *Attorney, Agent, or Firm* — Hamre, Schumann, Mueller & Larson, P.C.

(57) ABSTRACT

A truck mirror positioning device for adjusting the position of a rear-view truck mirror includes a mounting bracket adapted to be attached to a truck external to the truck driver's cabin. A pivotal support means is provided mechanically coupled to the mounting bracket for substantially supporting the weight of the truck mirror. An electric motor is mounted on the mounting bracket for moving the mirror, and a gearbox is mechanically coupled to the motor and adapted to be mechanically coupled to the truck mirror so as to adjust the plane in which the mirror lies wherein, in use, an operator can adjust the angle of the mirror by activating the electric motor.

7 Claims, 7 Drawing Sheets

(56) References Cited

U.S. PATENT DOCUMENTS

| | | | |
|---|---|---|---|
| 4,854,687 A * | 8/1989 | Fletcher | G02B 7/1827 |
| | | | 359/223.1 |
| 5,052,792 A * | 10/1991 | McDonough | B60R 1/025 |
| | | | 359/843 |
| 5,110,196 A | 5/1992 | Lang et al. | |
| 5,268,796 A * | 12/1993 | Tomerlin | B60R 1/0612 |
| | | | 248/486 |
| 5,566,029 A | 10/1996 | Zebold | |
| 5,714,852 A * | 2/1998 | Enderich | B60R 1/07 |
| | | | 318/112 |
| 6,315,420 B1 | 11/2001 | Standen et al. | |
| 2003/0086189 A1* | 5/2003 | Tsuyama | B60R 1/06 |
| | | | 359/872 |
| 2009/0316272 A1* | 12/2009 | Gibbs | B60R 1/085 |
| | | | 359/606 |

\* cited by examiner

TRUCK MIRROR POSITIONING DEVICE

FIELD OF THE INVENTION

The present invention relates to a truck mirror positioning device for adjusting the angle of a rear-view mirror mounted externally on a truck and relates particularly, though not exclusively, to such a device for use on vehicles employed in the mining industry.

BACKGROUND TO THE INVENTION

On large semi-trailer and large off-road trucks of the kind employed in road trains and in the mining industry, external rear vision mirrors are provided on both sides of the vehicle cabin of the prime mover. The mirrors have to be mounted some distance out from the cabin so as to provide a clear view for the driver along the full length of the vehicle. The mirrors are therefore also quite large and typically elongated in a vertical direction to provide a sufficiently extensive rear vision view. When the vehicle is moving the mirrors and mirror mounts are subject to environmental conditions causing shear forces, including high shock loads due to ground conditions and therefore they must be securely mounted to ensure the mirrors do not move or change their orientation. On the other hand it must be possible to adjust the position of the mirror, if required, to accommodate different lengths of vehicles, etc. Currently, such adjustment must be done manually by releasing several nuts and bolts, adjusting the position of the mirror and retightening the nuts and bolts. This operation is cumbersome and time-consuming, and obviously cannot be done while the vehicle is moving.

A suitable truck mirror adjusting device is described in co-pending International Application No PCT/AU2010/001252, the contents of which are incorporated herein by reference. This application describes a motorised positioning device for automatically adjusting the position of a mirror on a large vehicle, such as a truck, from inside the vehicle cabin. Whilst this device operates satisfactorily under most conditions, a significant proportion of the weight of the truck mirror is borne directly by a drive shaft of a gearbox in the device.

The present invention was developed with a view to providing a more robust truck rear-view mirror positioning device.

References to prior art in this specification are provided for illustrative purposes only and are not to be taken as an admission that such prior art is part of the common general knowledge in Australia or elsewhere.

SUMMARY OF THE INVENTION

According to one aspect of the present invention there is provided a truck mirror positioning device for adjusting the position of a rear-view truck mirror, the device comprising:
a mounting bracket adapted to be attached to a truck external to the truck driver's cabin;
a pivotal support means mechanically coupled to the mounting bracket for substantially supporting the weight of the truck mirror;
an electric motor mounted on the mounting bracket for moving the mirror; and,
a gearbox mechanically coupled to the motor and adapted to be mechanically coupled to the truck mirror so as to adjust the plane in which the mirror lies wherein, in use, an operator can adjust the angle of the mirror by activating the electric motor.

Preferably the pivotal support means comprises a lower pivot hinge connection adapted to pivotally connect a lower portion of the mirror to a lower pivot support bracket, wherein the mirror can tilt about the lower pivot hinge connection in a first direction about a substantially horizontal axis. In one embodiment the lower pivot support bracket is directly coupled to the mounting bracket via a swivel bearing connection. In another embodiment the lower pivot support bracket is indirectly coupled to the mounting bracket via a casing of the electric motor. Typically the lower pivot support bracket is coupled to the casing of the electric motor via a lower pivot mount bracket attached to the casing.

Typically the gearbox comprises a first drive shaft adapted to be mechanically coupled to the truck mirror in a substantially horizontal orientation, rotation of the first drive shaft tilting the mirror in the first direction. Preferably the mechanical coupling of the first drive shaft to the truck mirror comprises a cam means attached to the first drive shaft and an elongate push rod pivotally coupled to the cam wheel at one end and pivotally coupled at the other end to an upper portion of the truck mirror via an upper pivot hinge connection.

Preferably the device is adapted to adjust the plane in which the mirror lies in first and second substantially orthogonal directions. Preferably the electric motor is one of a pair of motors provided in a biaxial motor unit. Preferably the gearbox is a low speed/high ratio gearbox. Preferably the gearbox is integrated into the same casing with the biaxial motor unit.

Advantageously the biaxial motor unit is provided external to and separate from the mirror. Typically the gearbox comprises a second drive shaft substantially orthogonal to the first drive shaft and mechanically coupled to the mounting bracket, rotation of the second drive shaft pivoting the motor unit with the mirror coupled thereto in the second direction.

Preferably the mounting bracket comprises a C-shaped mounting bracket having first and second substantially parallel bracket portions, the second drive shaft being fixed to the first bracket portion.

According to another aspect of the present invention there is provided a truck mirror positioning device comprising:
a mounting bracket adapted to be attached to a truck external to the truck driver's cabin;
a truck mirror;
a pivotal support means pivotally coupled to the mounting bracket for substantially supporting the weight of the truck mirror;
a first actuator mounted on the mounting bracket for moving the mirror about a substantially vertical axis; and,
a second actuator mounted on the pivotal support means for moving the mirror about a substantially horizontal axis;
whereby, in use, an operator can adjust the angle of the mirror by activating either one or both of the first and second actuators.

Preferably the first and second actuators are elongate linear actuators. Typically the linear actuators are electrically driven linear actuators comprising an electric motor and an extension arm.

Preferably the pivotal support means comprises a substantially vertically oriented elongate support shaft, the support shaft being adapted to pivot about a substantially vertical axis and having a support arm fixed to one end, the support arm being mechanically coupled to the truck mirror at a first coupling point. Preferably the second actuator is mounted on the other end of the support shaft and is mechanically coupled to the truck mirror at a second coupling point. Preferably the first and second coupling points are hinge connections.

Preferably the first linear actuator is mechanically coupled at one end to the mounting bracket and the other end to the support arm.

Throughout the specification, unless the context requires otherwise, the word "comprise" or variations such as "comprises" or "comprising", will be understood to imply the inclusion of a stated integer or group of integers but not the exclusion of any other integer or group of integers. Likewise the word "preferably" or variations such as "preferred", will be understood to imply that a stated integer or group of integers is desirable but not essential to the working of the invention.

BRIEF DESCRIPTION OF THE DRAWINGS

The nature of the invention will be better understood from the following detailed description of a specific embodiment of a truck mirror positioning device, given by way of example only, with reference to the accompanying drawings, in which.

DETAILED DESCRIPTION OF PREFERRED EMBODIMENTS

Figure 1:
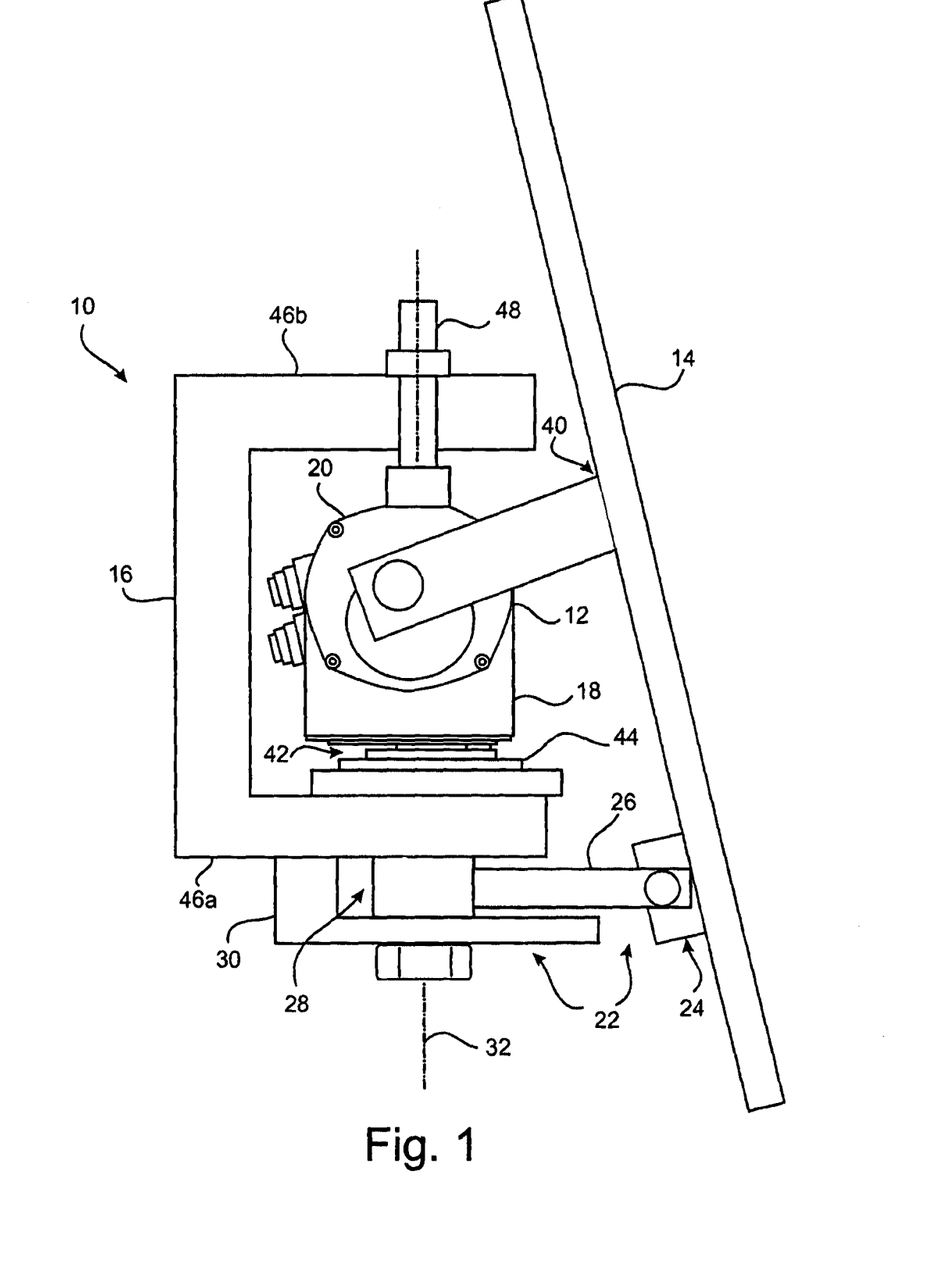
FIG. 1 illustrates a first embodiment of a truck mirror positioning device according to the present invention.
Figure 2:
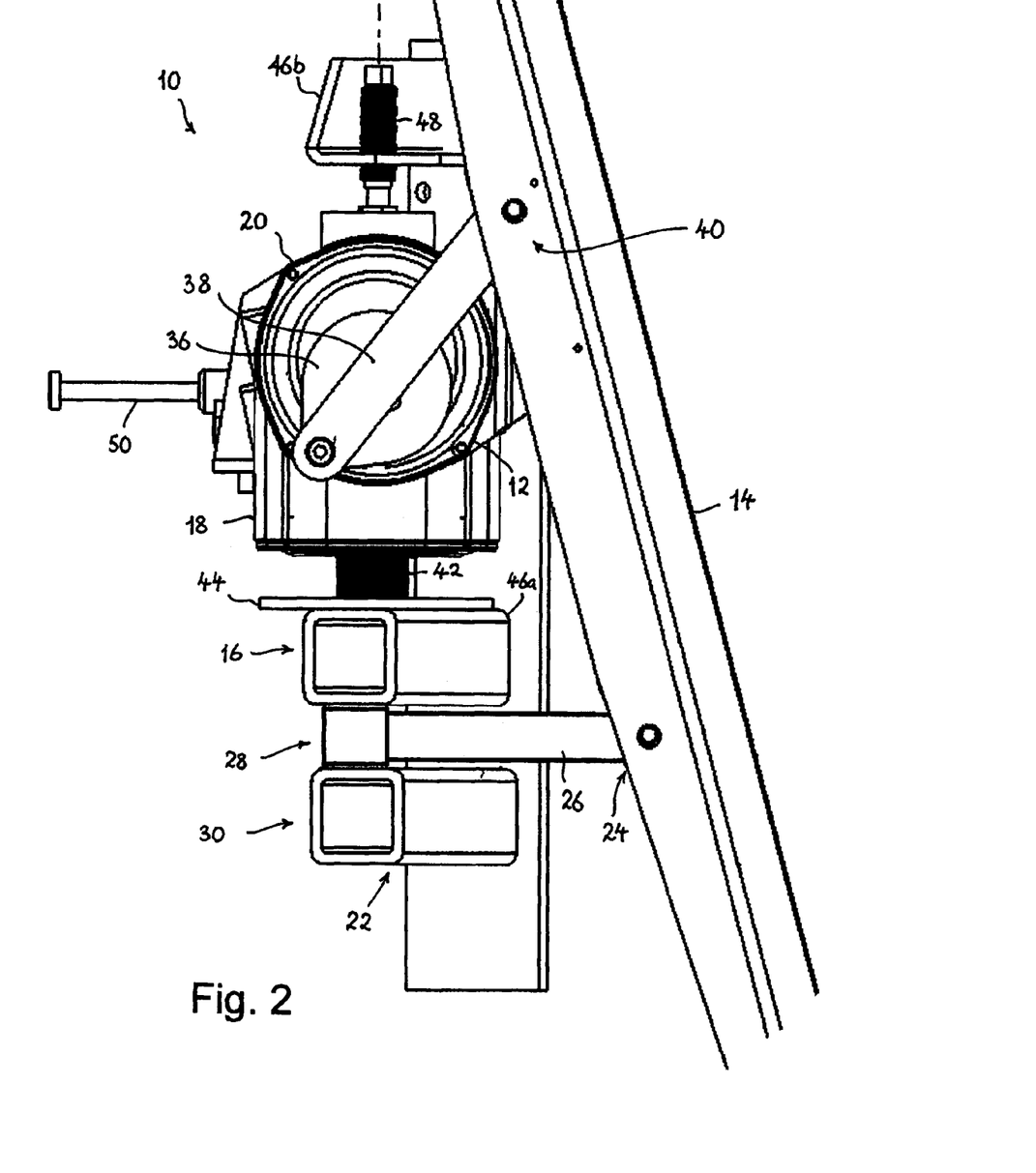
FIG. 2 is a close-up side view of an embodiment of the truck mirror positioning device similar to that of FIG. 1.

A first embodiment of a truck mirror positioning device 10 in accordance with the invention, as illustrated in FIGS. 1 and 2, comprises an electric motor 12 for moving a rear-view truck mirror 14. The device 10 further comprises a mounting bracket 16 adapted to be attached to a truck (not shown) external to the truck driver's cabin. The mounting bracket 16 shown in FIG. 2 is of a different configuration to that shown in FIG. 1, but performs the identical function. The electric motor 12 is mounted on the mounting bracket 16, as will be described in more detail below.

A typical truck mirror on an off-road truck of the kind employed in the mining industry can be up to 1.5 m in length and weigh up to 15 kg. Therefore the motor 12 must be capable of withstanding a substantial load, in addition to shear forces caused by environmental conditions such as wind shear and vibration due to road conditions. In this embodiment the electric motor is one of a pair of motors provided in a biaxial motor unit 12. The biaxial motor unit 12 has a typical load capacity of 25 kg balanced load, and is provided in a dual process heat treated gravity die cast aluminium casing 20. It is highly reliable with minimum backlash, and is constructed from precision-milled internal components with heavy-duty ball races on the major axes. Stainless steel fastenings and weatherproof 'O' ring and lip seals provide corrosion resistance and protection in all weather conditions. There is a simple external limit switch adjustment to provide up to 350° travel around the vertical axis. Regenerative braking aids rapid deceleration.

The device 10 further comprises a gearbox 18 mechanically coupled to the motor 12 and adapted to be mechanically coupled to the truck mirror 14 so as to adjust the plane in which the mirror 14 lies. In this embodiment the gearbox 18 is a low speed/high ratio gearbox which is integrated into the same casing 20 with the biaxial motor unit 12. Advantageously the casing 20 for the biaxial motor unit 12 and gearbox 18 is provided external to and separate from the mirror 14.

The truck mirror positioning device 10 further comprises a pivotal support means 22 mechanically coupled to the mounting bracket 16 for supporting substantially the whole weight of the truck mirror 14. Preferably the pivotal support means 22 comprises a lower pivot hinge connection 24 adapted to pivotally connect a lower portion of the rear-view mirror 14 to a lower pivot support bracket 26 wherein, in use, the mirror 14 can tilt about the lower pivot hinge connection 24 about a substantially horizontal axis.

In this embodiment the lower pivot support bracket 26 is directly coupled to the mounting bracket 16 via a swivel bearing connection 28. The swivel bearing connection 28 is rotatably mounted in a bearing mount 30 provided on the underside of the mounting bracket 16. The bearing mount 30 is adapted to permit the swivel bearing connected to the lower pivot support bracket 26 to rotate about a vertical axis that is substantially coaxial with a central vertical pivot axis 32 of the biaxial motor unit 12 and gearbox 18.

In this embodiment the gearbox 18 comprises a first drive shaft 34 (not visible) which is adapted to be mechanically coupled to the truck mirror 14 in a substantially horizontal orientation. Preferably the mechanical coupling of the first drive shaft 34 to the truck mirror comprises a cam means in the form of cam wheel 36 attached to the first drive shaft 34 and an elongate push rod 38. The push rod 38 is pivotally connected to the cam wheel 36 at one end and pivotally coupled at the other end to an upper portion of the truck mirror 14 via an upper pivot hinge connection 40. The pivotal connection of the push rod 38 to the cam wheel 36 is offset from the axis of rotation of the first drive shaft 34.

When the first drive shaft 34 of the gearbox 18 is activated, via the corresponding electric motor in the biaxial motor unit 12, the cam wheel 36 converts the rotary motion of the drive shaft 34 to a linear motion of the push rod 38. Depending of the direction of rotation of the first drive shaft 34, the push rod 36 will either move outwards away from the motor unit 12, or inwards towards the motor unit 12. This results in a tilting movement of the truck mirror 14 about the upper and lower pivot hinge connections 24 and 40 respectively. In this manner rotation of the first drive shaft 34 will cause the mirror 14 to tilt about a substantially horizontal axis to provide up and down adjustment of the view in the rear-view mirror 14.

Preferably the device 10 is adapted to adjust the plane in which the mirror 14 lies in first and second substantially orthogonal directions. The gearbox 18 further comprises a second drive shaft 42, substantially orthogonal to the first drive shaft 34 and adapted to be mechanically coupled to the mounting bracket 16. In this embodiment the mounting bracket comprises a C-shaped mounting bracket having first and second substantially parallel bracket portions 46a and 46b. The second drive shaft 42 is fixed to the first bracket portion 46a of the mounting bracket 16 via a fixing plate 44.

The biaxial motor unit 12 also has a top mounting pin 48 fixed to the top of casing 20 and pivotally mounted to the second bracket portion 46b of the mounting bracket 16 coaxial with the axis of the second drive shaft 42. The top mounting pin 48 provides the motor unit 12 with a secure mounting and holds it steady in the mounting bracket 16. Rotation of the second drive shaft 42 causes the motor unit 12 to pivot, with the mirror 14 coupled thereto, in the second direction about its central vertical axis 32. In this embodiment, pivoting of the motor unit 12 in the second direction results in left to right, or vice versa, (panning) adjustments of the view in the rear-view mirror 14.

The mirror motor unit 12 has the flexibility to move in an arc in both the tilt and pan planes (+/−20° in tilt and over 90° in pan). This allows for quick maneuvering of the mirror 14 into a position for safe and rapid replacement of the mirror lens as required.

Preferably the device 10 preferably also includes a damper 50 which is mounted on the side of the casing 20 and presses against a rear surface of the truck mirror 14. The damper 50 provides additional stability and vibration protection.

The truck mirror adjusting device 10 typically further comprises an electronic controller (not shown) operatively connected to the biaxial motor unit 12 for controlling the motor speed. In use, an operator can adjust the angle of the mirror 14 by activating the biaxial motor unit 12 via the electronic controller. Advantageously the electronic controller comprises a remote control means to permit the controller to be operated remotely from within the driver's cabin of the truck on which the mirror 14 is mounted.

Figure 3:
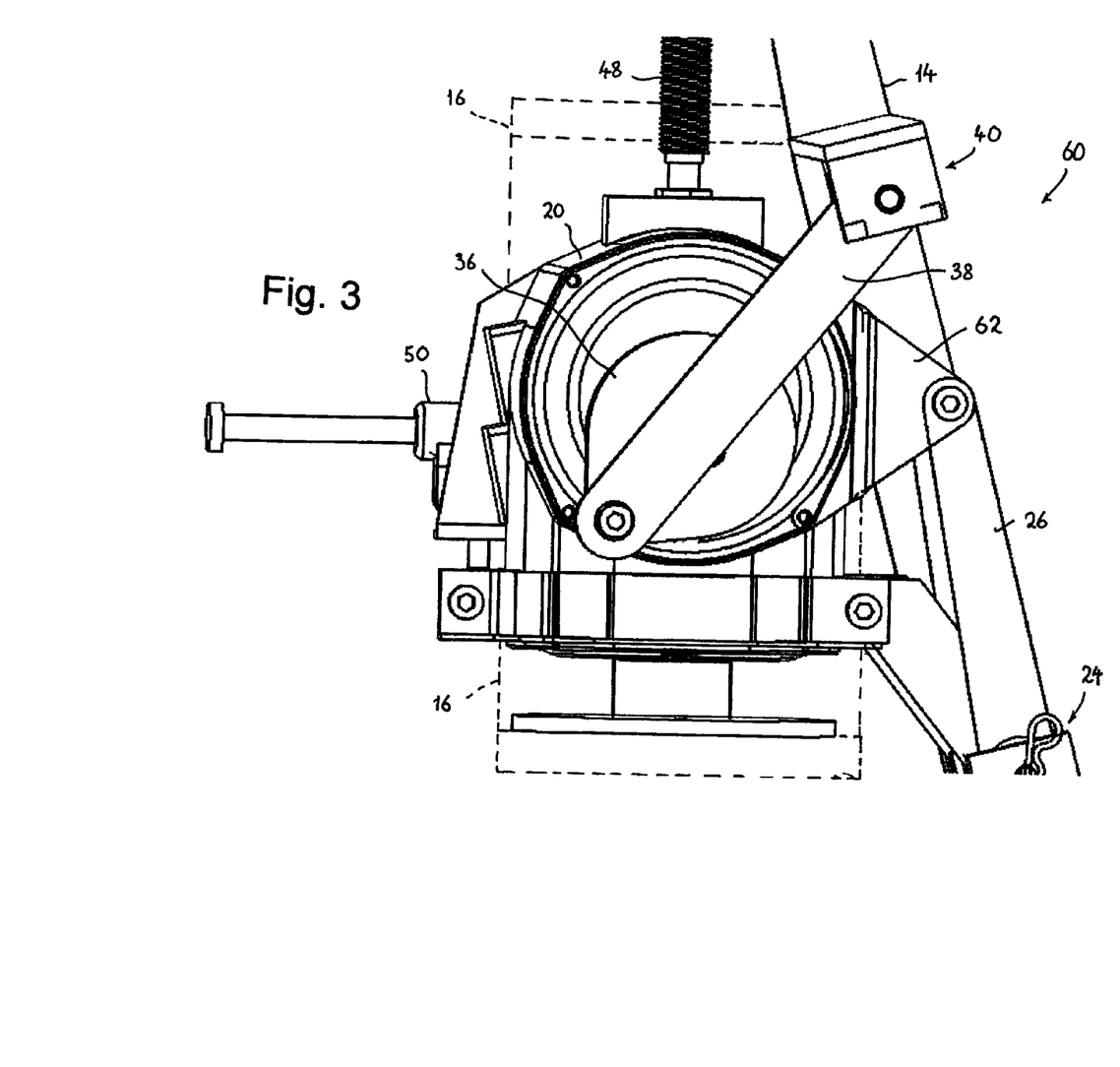
FIG. 3 is a close-up side view of a second embodiment of a truck mirror positioning device according to the present invention.
Figure 4:
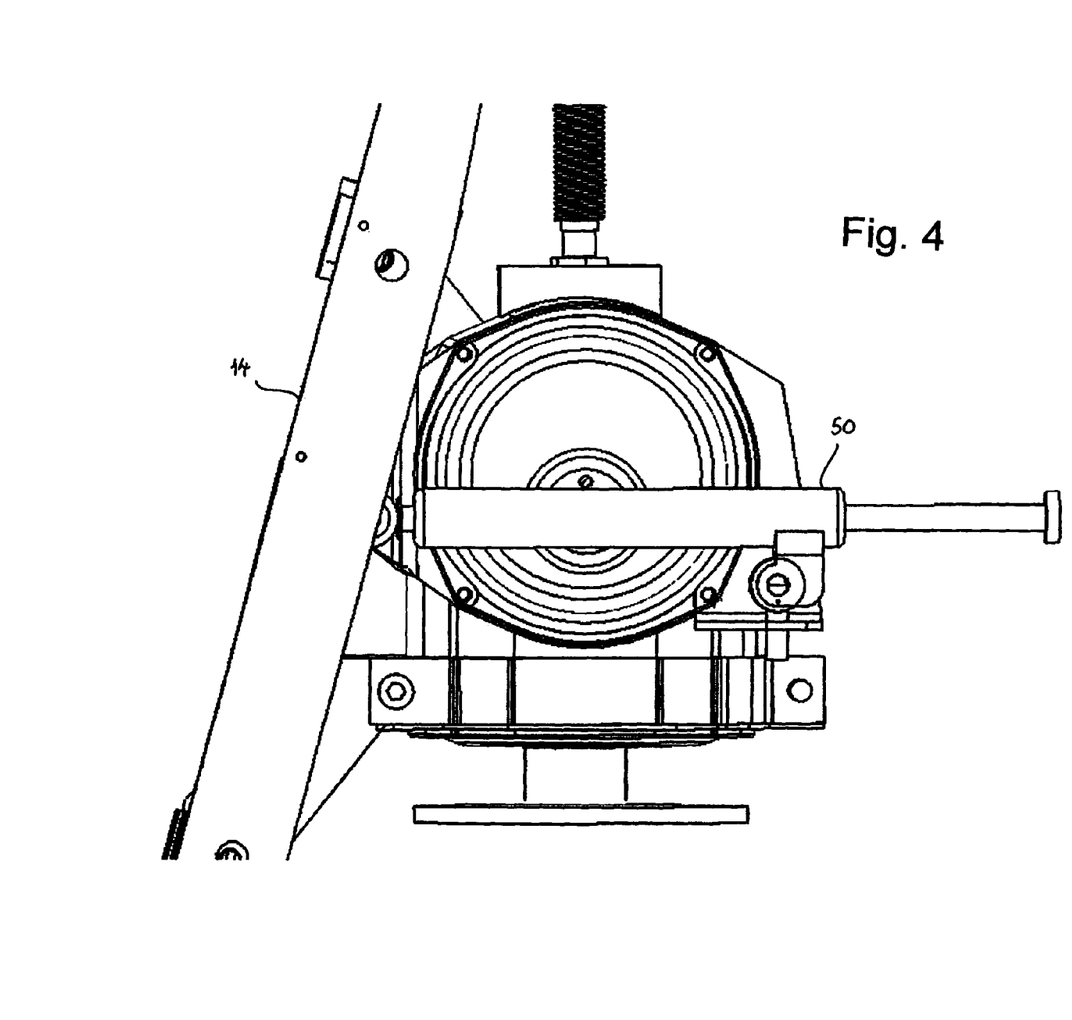
FIG. 4 is a close-up side view of the truck mirror positioning device of FIG. 3 viewed from the opposite side.
Figure 5:
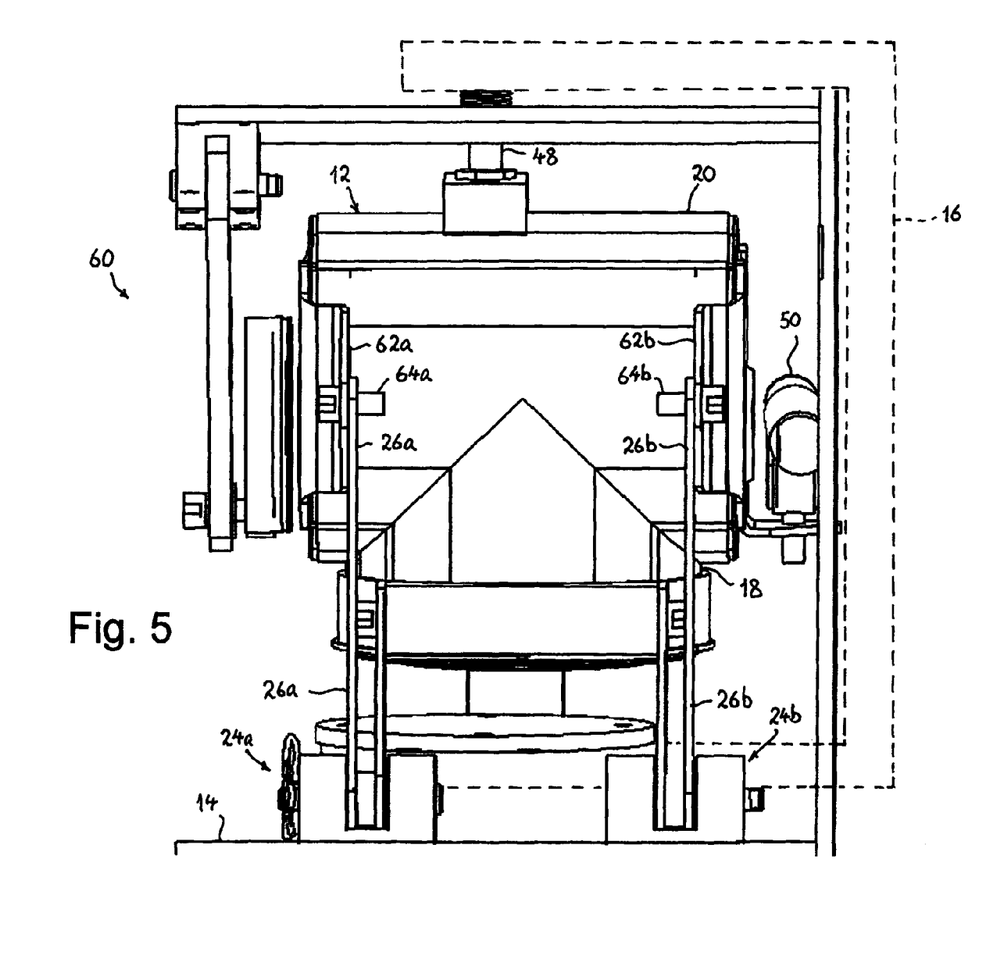
FIG. 5 is a close-up rear view of the truck mirror positioning device of FIG. 3.
Figure 6:
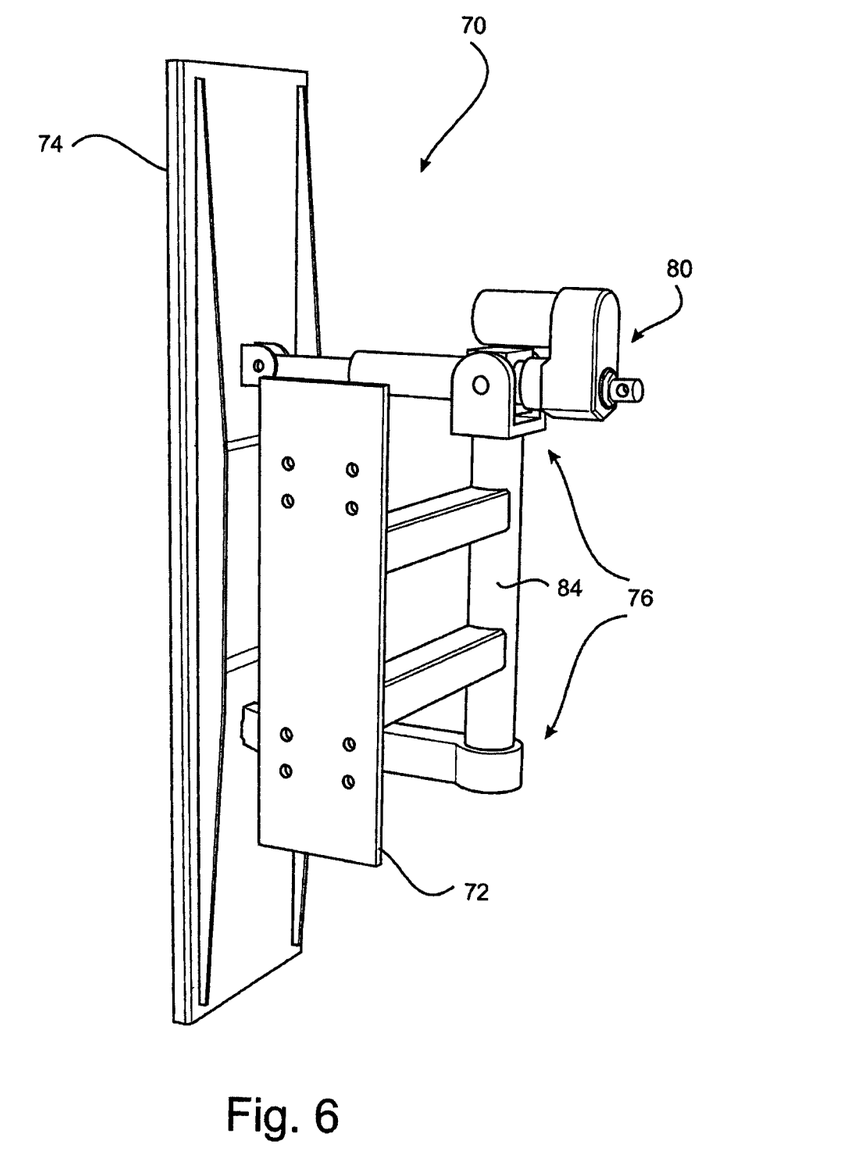
FIG. 6 is a rear perspective view of a third embodiment of a truck mirror positioning device according to the present invention.
Figure 7:
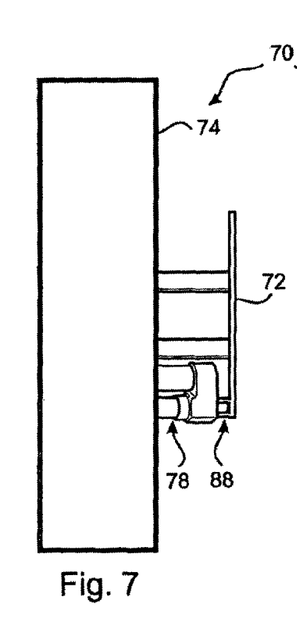
FIG. 7 is a front elevation of the truck mirror positioning device of FIG. 6.

FIGS. 3 to 5 illustrate a second embodiment of the truck mirror positioning device 60 according to the present invention. The device 60 is similar to the first embodiment 10, and therefore the same reference numerals will be used to refer to the like parts and these will not be described again in detail. The device 60 comprises a mounting bracket 16 (shown in FIGS. 3 and 5 broken outline) adapted to be attached to a truck external to the truck driver's cabin. A pivotal support means 22 is mechanically coupled to the mounting bracket 16 for substantially supporting the weight of the truck mirror 14. An electric motor 12 is mounted on the mounting bracket 16 for moving the mirror 14 and a gearbox 18 is mechanically coupled to the motor.

As in the first embodiment 10, the electric motor in the device 60 is preferably a biaxial motor unit 12 with the gearbox 18 integrated into a single die cast aluminium casing 20. The gearbox 18 is adapted to be mechanically coupled to the truck mirror 14 so as to adjust the plane in which the mirror lies wherein, in use, an operator can adjust the angle of the mirror by activating the electric motors in the biaxial motor unit 12.

The pivotal support means 22 preferably comprises a lower pivot hinge connection 24 adapted to pivotally connect a rower portion of the mirror 14 to a lower pivot support bracket 26, wherein the rear-view mirror 14 can tilt about the lower pivot hinge connection 24 about a substantially horizontal axis. However in this embodiment the lower pivot support bracket 26 is indirectly coupled to the mounting bracket 16 via the casing 20. Typically the lower pivot support bracket 26 is coupled to the casing 20 of the biaxial motor unit 12 via a lower pivot mount bracket 62 attached to the casing 20, as can be seen most clearly in FIG. 3.

Preferably the lower pivot support bracket is one of a pair of lower pivot support brackets 26a and 26b, and the lower pivot mount bracket is one of a pair of lower pivot mount brackets 62a and 62b attached to the casing 20, as can be seen most clearly in FIG. 5. The lower pivot support brackets 26 are pivotally connected to the lower pivot mount brackets 62 by respective pivot pins 64. The lower pivot support brackets 26a and 26b are pivotally connected to respective lower pivot hinge connections 24a and 24b. The casing 20 is supported on the bracket 16 via the top mounting pin 48. In this way substantially the whole of the weight of truck mirror 14 is carried by the bracket 16, via the lower pivot mount brackets 62 and casing 20.

As in the previous embodiment 10, the mechanical coupling of the first drive shaft 34 of the gearbox 18 to the truck mirror 14 comprises a cam means in the form of cam wheel 36 attached to the first drive shaft 34 and an elongate push rod 38. The push rod 38 is pivotally connected to the cam wheel 36 at one end and pivotally coupled at the other end to an upper portion of the truck mirror 14 via an upper pivot hinge connection 40, as can be seen most clearly in FIG. 3.

In other respects the truck mirror positioning device 60 of this embodiment is similar to the device 10 of the first embodiment and will not be described again here.

A third embodiment of a truck mirror positioning device 70 in accordance with the invention, as illustrated in FIGS. 6 to 11, comprises a mounting bracket 72 adapted to be attached to a truck (not shown) external to the truck driver's cabin. The truck mirror positioning device includes a truck mirror 74 and a pivotal support means 76 pivotally coupled to the mounting bracket 72 for substantially supporting the weight of the truck mirror 74.

A first actuator 78 is mounted on the mounting bracket 72 for moving the mirror 74 about a substantially vertical axis, and a second actuator 80 is mounted on the pivotal support means 76 for moving the mirror 74 about a substantially horizontal axis. In use, an operator can adjust the angle of the mirror 74 by activating either one or both of the first and second actuators 78 and 80.

Figure 8:
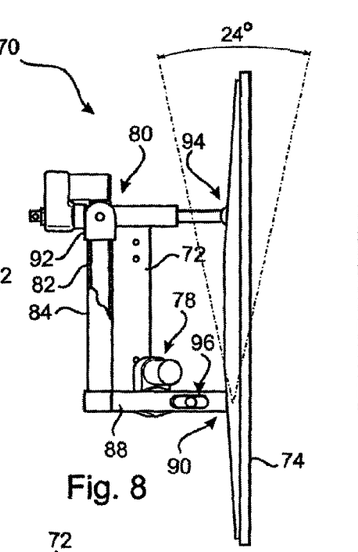
FIG. 8 is a left side elevation of the truck mirror positioning device of FIG. 6.
Figure 9:
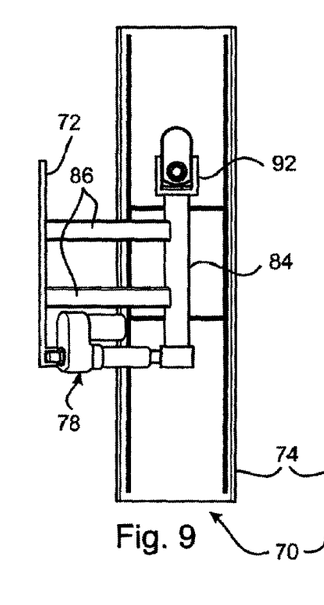
FIG. 9 is a rear elevation of the truck mirror positioning device of FIG. 6.
Figure 10:
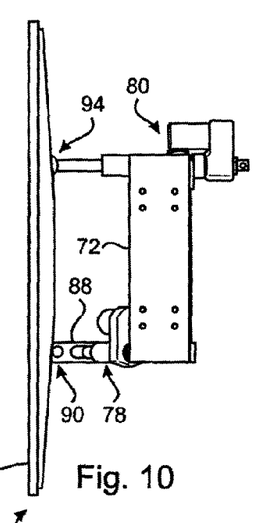
FIG. 10 is a right side elevation of the truck mirror positioning device of FIG. 6; and, FIG. 11 is a plan view of the truck mirror positioning device of FIG. 6.

In this embodiment the pivotal support means 76 comprises a substantially vertically oriented elongate support shaft 82 (see FIG. 8), which is rotatably received in a sleeve 84 fixed to the mounting bracket 72 by a pair of brace members 86, as can be seen most clearly in FIG. 9. A pair of flanged bearings (not visible) provided at the top and bottom of the sleeve 84 minimises friction during rotation of the support shaft 82. The support shaft 82 is adapted to pivot about a substantially vertical axis and has a support arm 88 fixed to one end. In the illustrated embodiment the support arm 88 is fixed to the lower end of the support shaft 82 and is mechanically coupled to the rear of the truck mirror at a first coupling point 90, as can be seen most clearly in FIGS. 8 and 10.

At its upper end the support shaft 82 has a U-shaped support bracket 92 fixed thereto for supporting the second actuator 80. The second actuator 80 is preferably pivotally mounted on the support bracket 92 at the top end of the support shaft 82, and is mechanically coupled to the rear of the truck mirror 74 at a second coupling point 94. Preferably the first and second coupling points 90 and 94 are hinge connections. It will be appreciated that substantially the whole weight of the mirror 74 is carried by the support arm 88 via the hinge connection on the rear of the mirror 74 at the first coupling point 90.

In the illustrated embodiment, the first and second actuators 78 and 80 are elongate linear actuators. Preferably the linear actuators 78 and 80 are electrically driven linear actuators comprising an electric motor and an extension arm. Suitable electrically driven linear actuators, for example, are the CAHB-10 Series and CAHB-20 Series linear actuators manufactured by SKF. Each linear actuator comprises a 12/24 Volt DC electric motor which drives an aluminium extension tube via powder metal gears and an ACME screw drive. The first actuator 78 is preferably a linear actuator with a stroke length of 102 mm, whereas the second actuator 80 is preferably a linear actuator with a stroke length of 204 mm.

Although electrically driven linear actuators are shown in the illustrated embodiment, any suitable actuator may be employed, including hydraulic and pneumatic actuators.

Figure 11:
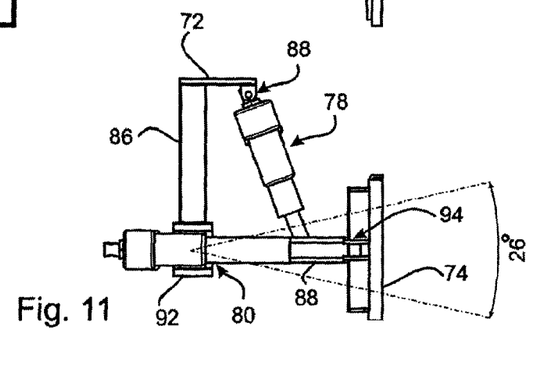

As can be seen most clearly in FIG. 11, the first linear actuator 78 is mechanically coupled at one end to the mounting bracket 72 and the other end to the support arm 88. The support arm 88 has an elongate slot 96 provided intermediate its length, as can be seen most clearly in FIG. 8. Preferably the extension arm of the first linear actuator 78 extends into the slot 96 and is pivotally held therein by a pivot pin (not visible). At its rear end the linear actuator 78 is preferably also pivotally connected to the mounting bracket 72 by a pivot pin 98, as can be seen most clearly in FIG. 11.

Hence when the first linear actuator 78 is activated, and its extension arm is extended or retracted, it will cause the support arm 88 to pivot about the central axis of the support shaft 82. Between its fully retracted and fully extended positions, the first actuator will cause the support arm 88 to pivot through an arc of approximately 26°, as shown in FIG. 11. Since the mirror 74 is supported on the support arm 88 this will produce a side to side panning motion of the mirror 74.

As noted above, the second actuator 80 is pivotally mounted on the support bracket 32 at the top end of the support shaft 82, and is mechanically coupled to the rear of the mirror 74 by a hinge connection at the second coupling point 94. Since the mirror 74 is hingedly supported on the support arm 88 at the first coupling point 90, when the second actuator 80 is activated, and its extension arm is extended or retracted, it will cause the mirror 74 to pivot about the first coupling point 90. Between its fully retracted and fully extended positions, the second actuator 80 will cause the mirror 74 to pivot about a substantially horizontal axis through an arc of approximately 24°, as shown in FIG. 8. Since the mirror 74 is supported on the support arm 88 this will produce a tilting motion of the mirror 74.

Preferably the truck mirror positioning device further comprises an electronic controller 100, (not illustrated) for controlling activation of the first and second linear actuators 78 and 80. Preferably the controller 100 is located in the vehicle cabin. The controller 100 preferably enables the first and second linear actuators 78 and 80 to be activated independently or simultaneously. Preferably the controller 100 comprises a joystick for controlling motion of the mirror 74 about the horizontal (panning) and vertical (tilting) axes.

Now that several embodiments of the truck mirror positioning device for adjusting the position of a truck rear-view mirror has been described in detail, it will be apparent that the described embodiments provide a number of advantages over the prior art, including the following:

(i) They allow automated adjustment of the position of a truck mirror by the truck operator while seated in the vehicle cabin.

(ii) They provide a more robust support for the truck mirror which may be subject to high shear forces and severe vibration.

(ii) They enable the operator to make fine adjustments to the rear vision mirror to provide a clear view on both sides of the vehicle.

(iii) They are simple to install and operate, and can be retrofitted to existing vehicles.

(iv) They obviate the need to release and retighten nuts and bolts whenever the position of the truck mirror needs adjustment.

It will be readily apparent to persons skilled in the relevant arts that various modifications and improvements may be made to the foregoing embodiments, in addition to those already described, without departing from the basic inventive concepts of the present invention. Therefore, it will be appreciated that the scope of the invention is not limited to the specific embodiments described and is to be determined from the appended claims.

The invention claimed is:

1. A truck mirror positioning device comprising:
   a mounting bracket adapted to be attached to a truck external to the truck driver's cabin;
   a truck mirror;
   a pivotal support means mechanically coupled to the mounting bracket for substantially supporting the weight of the truck mirror, the pivotal support means being pivotally coupled to the mirror at first and second coupling points, and wherein the first and second coupling points are hinge connections adapted to substantially support the weight of the mirror;
   a first elongate linear actuator mounted on the device for moving the mirror about a substantially vertical axis; and,
   a second elongate linear actuator mounted on the device for moving the mirror about a substantially horizontal axis;
   whereby, in use, an operator can adjust the angle of the mirror by activating either one or both of the first and second actuators;
   wherein the linear actuators are electrically driven linear actuators including an electric motor and an extension arm;
   wherein the pivotal support means includes a substantially vertically oriented elongate support shaft which is rotatably received in a sleeve fixed to the mounting bracket, the support shaft being adapted to pivot about a substantially vertical axis; and
   wherein the support shaft has a support arm fixed to one end, the support arm being mechanically coupled to the truck mirror at the first coupling point.

2. A truck mirror positioning device as defined in claim 1, wherein the second actuator is mounted on the other end of the support shaft and is mechanically coupled to the truck mirror at the second coupling point.

3. A truck mirror positioning device as defined in claim 2, wherein the first linear actuator is mechanically coupled at one end to the mounting bracket and the other end to the support arm.

4. A truck mirror positioning device as defined in claim 3, wherein the support shaft has a U-shaped support bracket fixed thereto at the top end of the support shaft for supporting the second actuator, and the second actuator is pivotally mounted on the U-shaped support bracket.

5. A truck mirror positioning device as defined in claim 1, further comprising an electronic controller for controlling activation of the first and second actuators.

6. A truck mirror positioning device as defined in claim 5, wherein the controller is located in the vehicle cabin and enables the first and second actuators to be activated independently or simultaneously.

7. A truck mirror positioning device as defined in claim 6, wherein the controller comprises a joystick for controlling motion of the mirror about the horizontal (panning) and vertical (tilting) axes.

* * * * *